(12) United States Patent
Kuhn et al.

(10) Patent No.: US 10,487,882 B2
(45) Date of Patent: Nov. 26, 2019

(54) MUD MOTOR TRANSMISSION

(71) Applicant: LORD Corporation, Cary, NC (US)

(72) Inventors: James F. Kuhn, Erie, PA (US); Keith R. Ptak, Erie, PA (US)

(73) Assignee: LORD Corporation, Cary, NC (US)

( * ) Notice: Subject to any disclaimer, the term of this patent is extended or adjusted under 35 U.S.C. 154(b) by 310 days.

(21) Appl. No.: 15/303,647

(22) PCT Filed: Nov. 5, 2014

(86) PCT No.: PCT/US2014/064080
§ 371 (c)(1),
(2) Date: Oct. 12, 2016

(87) PCT Pub. No.: WO2015/171176
PCT Pub. Date: Nov. 12, 2015

(65) Prior Publication Data
US 2017/0045090 A1    Feb. 16, 2017

Related U.S. Application Data

(60) Provisional application No. 61/988,688, filed on May 5, 2014.

(51) Int. Cl.
*F16D 3/72* (2006.01)
*F16D 3/46* (2006.01)

(52) U.S. Cl.
CPC .............. *F16D 3/46* (2013.01); *F16D 3/72* (2013.01)

(58) Field of Classification Search
CPC ... E21B 7/04; E21B 17/05; F16D 3/44; F16D 3/46; F16D 3/50; F16D 3/72

USPC ................ 464/110, 147, 150, 151, 155, 182
See application file for complete search history.

(56) References Cited

U.S. PATENT DOCUMENTS

| | | | | |
|---|---|---|---|---|
| 1,625,511 A | | 4/1927 | Friedrich | |
| 2,451,791 A | * | 10/1948 | Weaver .................. | F16D 3/265 285/235 |
| 4,452,592 A | * | 6/1984 | Tsai ......................... | F16D 3/04 464/147 |
| 4,547,101 A | * | 10/1985 | Dowdakin, Sr. ........ | B23B 31/08 464/155 |
| 4,560,368 A | * | 12/1985 | Sherman, II ............. | F16D 3/26 464/147 |
| 4,565,541 A | | 1/1986 | Obrecht | |
| 4,599,056 A | * | 7/1986 | Crase .................. | F04C 15/0076 418/48 |
| 4,941,861 A | * | 7/1990 | Painter ..................... | F16D 3/04 464/147 |
| 5,022,645 A | * | 6/1991 | Green .................... | B65H 5/021 271/276 |
| 5,078,650 A | | 1/1992 | Foote | |

(Continued)

FOREIGN PATENT DOCUMENTS

DE         1206669 B  * 12/1965  ............... F16D 3/46
DE   102011118655 A1 *  5/2013  ............... F16D 3/46
(Continued)

*Primary Examiner* — Josh Skroupa

(57) ABSTRACT

A double knuckle coupling suitable for transmitting torque applied to a first input shaft to a second shaft wherein the coupling accommodates angular changes between the shafts. Additionally, the disclosure describes an improved mud motor transmission incorporating the coupling.

9 Claims, 13 Drawing Sheets

(56) References Cited

U.S. PATENT DOCUMENTS

| | | | | |
|---|---|---|---|---|
| 5,288,271 | A * | 2/1994 | Nelson | E21B 17/05 |
| | | | | 464/114 |
| 6,517,439 | B1 * | 2/2003 | Sears | F16D 3/04 |
| | | | | 464/104 |
| 6,875,114 | B2 * | 4/2005 | Barron | F16D 3/64 |
| | | | | 403/314 |
| 8,469,830 | B2 * | 6/2013 | Zhao | F16D 3/46 |
| | | | | 464/151 |
| 9,057,408 | B2 * | 6/2015 | Dupielet | F16D 3/44 |
| 9,228,615 | B2 * | 1/2016 | Grimmel | F16D 3/265 |

FOREIGN PATENT DOCUMENTS

| | | | | |
|---|---|---|---|---|
| JP | 03125022 A | * | 5/1991 | F16D 3/46 |
| WO | 2014/022765 | | 2/2014 | |

* cited by examiner

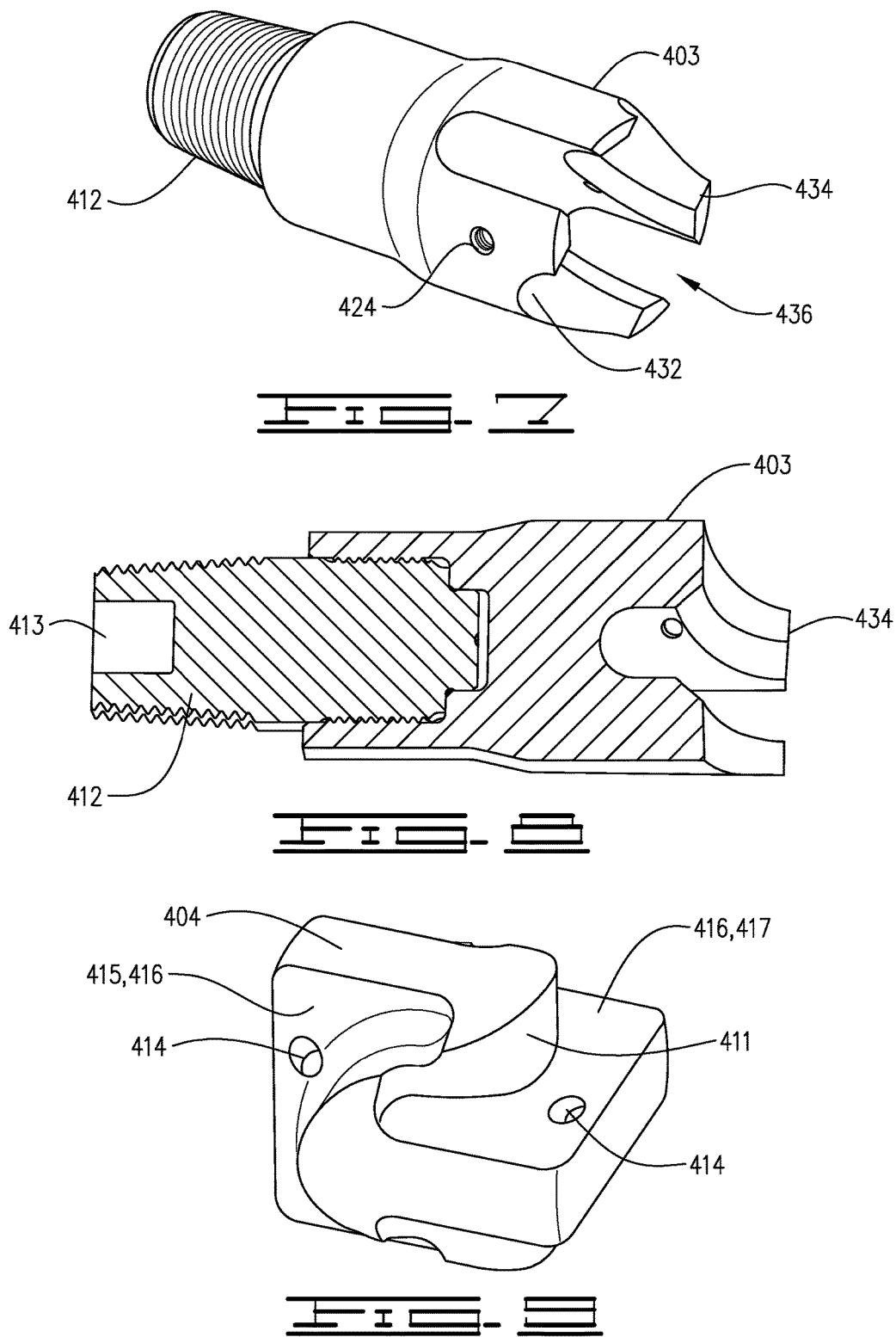

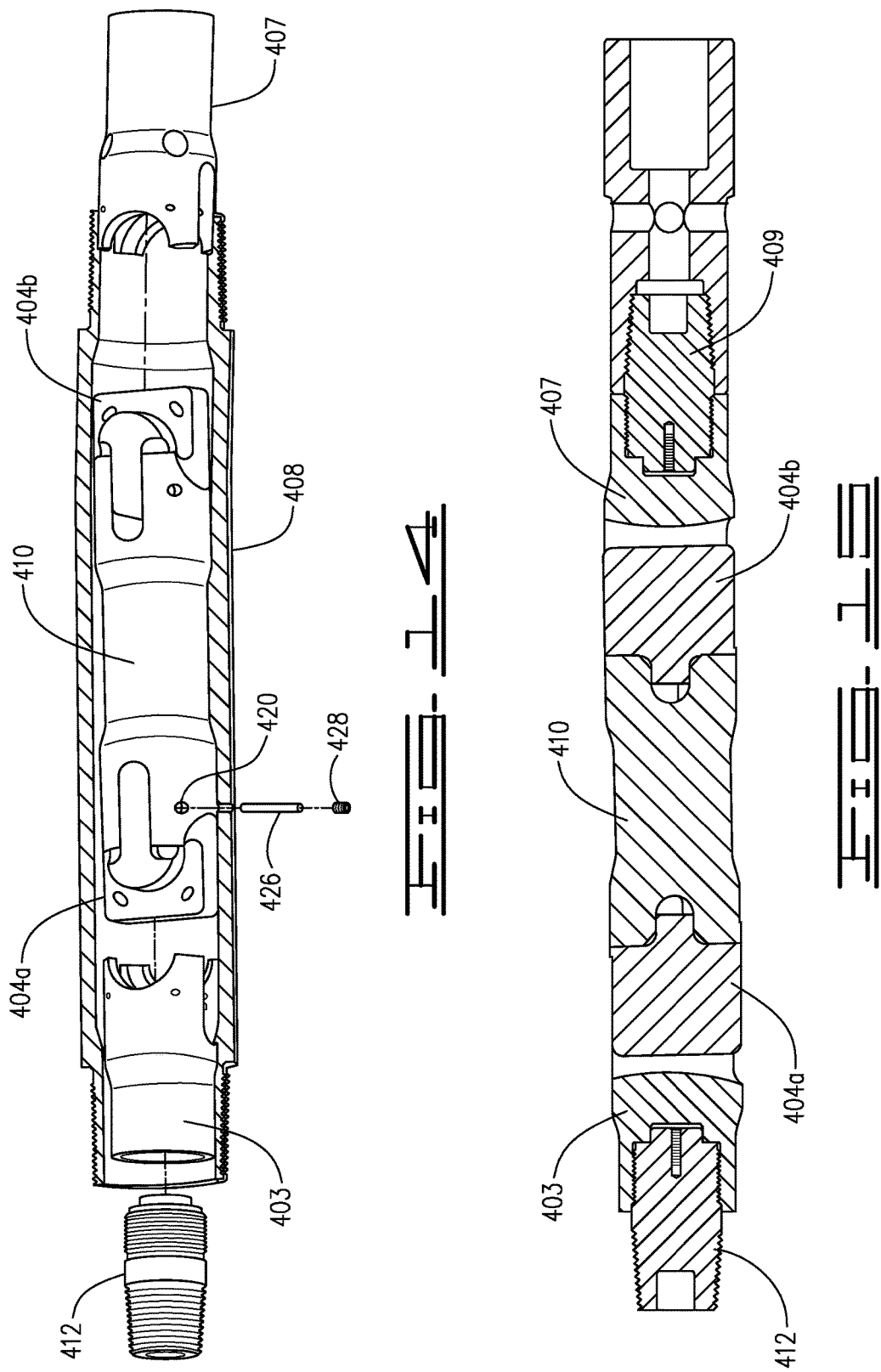

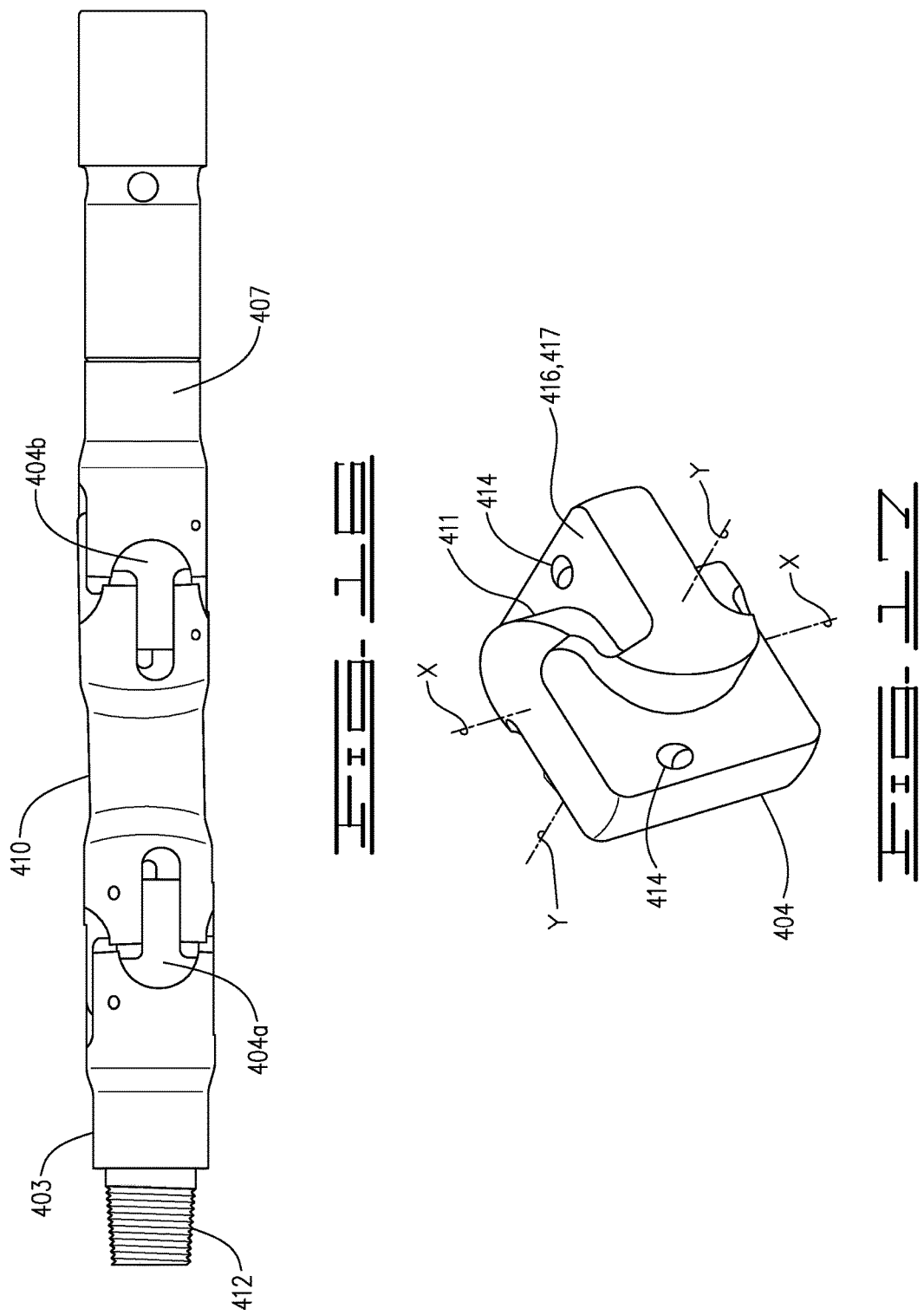

MUD MOTOR TRANSMISSION

CROSS-REFERENCE TO RELATED APPLICATIONS

The present application claims the benefit of U.S. Provisional Patent Application Ser. No. 61/988,688, filed May 5, 2014, the disclosure of which is incorporated herein by reference in its entirety.

BACKGROUND

When drive shafts must accommodate changes in angular relationship, the transfer of energy from one shaft to another requires a coupling suitable for transferring torsional force, i.e. torque, while permitting relative movement between shafts on either side of the coupling. Universal joints and constant velocity joints are two commonly used couplings for this purpose. In the oil production industry, jaw clutches or similar devices provide this function. When used to convey both torque and axial loads, these couplings are placed under extreme loads leading to premature failure.

The present invention provides a new coupling suited for transferring torsional energy from one shaft to another. In particular, the coupling of the present invention permits transfer of torsional energy from one shaft to another while accommodating eccentric or parallel offset shaft alignments. As a result, the present invention substantially eliminates or at least substantially minimizes angular changes in movement produced at either input shaft.

SUMMARY

In one embodiment, the present invention provides couplings suitable for transferring torsional energy from one shaft to another. A first coupling comprises a first input shaft having a first end and a second end. The second end has at least one recessed slot and at least one outwardly projecting ridge. Additionally, the coupling includes a second input shaft having a first end and a second end. The second end of the second input shaft carries a second coupling in the form of double knuckle coupling. The second coupling may be secured to the second end of the second input shaft by any conventional arrangement suitable for the end use of the components. The first end of the second input shaft has at least one recessed slot and at least one outwardly projecting ridge. Positioned between the first and second input shafts is a wear disk having a first wear surface and a second wear surface. The first wear surface has at least one outwardly projecting ridge and at least one recessed slot and the second wear surface has at least one outwardly projecting ridge and at least one recessed slot. The ridges of the input shafts are received within the slots of the wear disk while the ridges of the wear disk are received within the slots of the input shafts. Thus, the first coupling permits lateral movement of components relative to one another. The, second coupling, i.e. the double knuckle coupling carried by the second end of the second input shaft, is a double knuckle coupling that includes a coupling input yoke, a coupling center element and a coupling output yoke. The coupling input yoke has a slot defining a tongue and groove arrangement with each tongue having an arcuate recess. The coupling output yoke corresponds in configuration to the coupling input yoke. Thus, the first end of double knuckle coupling is secured to the intermediate shaft or second input shaft and the second end has a slot defining a tongue and groove arrangement with each tongue having an arcuate recess. Coupling center element has a first tongue configured to be received within the slot of coupling input yoke and a pair of knuckles configured to be received within the arcuate recesses of each tongue of the coupling input yoke. Additionally, coupling center element has a second tongue configured to be received within the slot of coupling output yoke and a pair of knuckles configured to be received within the arcuate recesses of each tongue of the coupling output yoke. The relative lengths of each tongue of the components in the second coupling may vary depending upon the components driven by the shafts connected by the describe couplings. Finally, all of the components may be positioned within a housing.

In another embodiment, the present invention provides a drive shaft comprising an input shaft, a center shaft, an output shaft and two center coupling elements. The input shaft, first center coupling and first end of the center shaft define a first double knuckle coupling. The output shaft, second center coupling and second end of the center shaft define a second double knuckle coupling. The first and second ends of the center shaft carry coupling yokes each coupling yoke defines a tongue and groove arrangement with each tongue having an arcuate recess. The grooves defined by the first and second coupling yokes may be in-line with one another or out of alignment with one another. The first end of the input shaft is configured for attachment to a power input component and the second end of the input shaft defines a tongue and groove arrangement with each tongue having an arcuate recess. The input shaft may be an integral component or the input shaft may carry an input shaft adapter suitable for securing the input shaft to a driving component. The first end of the output shaft defines a tongue and groove arrangement with each tongue having an arcuate recess and the second end of the output shaft configured to be attached to a driven component. In one embodiment, the output shaft is an integral component including fluid flow ports suitable for use as a flow diverter in the downhole environment. In another embodiment, the output shaft carries an output shaft adapter suitable for securing to a driven component such as a flow diverter or other driven component. In one embodiment, each tongue also has a retaining pin bore. Each coupling center has first and second tongues with each tongue defining a torque reaction face. Additionally, each coupling center has a pair of knuckles configured to be received within the arcuate recesses of each tongue. A knuckle is located on each side of the coupling center's tongues. Thus, the knuckles are separated or spaced apart for alignment with the arcuate recesses of the respective receiving tongues. For the first coupling center, the first tongue is positioned within the slot defined by the tongue and groove configuration carried by the input shaft and the first knuckles are received within the arcuate recesses of the input shaft's tongues. The second tongue of the first coupling center is positioned within the slot defined by the tongue and groove configuration carried by the first end of the center shaft and the second knuckles of the first coupling center are positioned within the arcuate recesses of the tongues of the first end of the center shaft. Likewise, the first tongue of the second coupling center is positioned within the slot defined by the tongue and groove configuration of the second end of the center shaft with the first pair of knuckles carried by the second coupling center positioned within the arcuate recesses of the tongues of the second end of the center shaft. Following assembly of the drive shaft components positioned within each retaining pin bore is a retaining pin.

BRIEF DESCRIPTION OF THE DRAWINGS

FIG. 6 is a perspective view of a second embodiment of the invention in a cutaway view of a housing. The perspective view depicts two double knuckle couplings joining an input shaft, a center shaft and an output shaft.

FIG. 7 depicts a side view of the input shaft with an input shaft adapter.

FIG. 8 depicts a side cutaway view of the input shaft with input shaft adapter.

FIG. 9 depicts the center coupling element.

FIG. 14 is a partial cut-away view showing an exploded view of the double coupling positioned within a cut-away of a bent housing suitable for use in a drill string.

FIG. 15 is a side cut-away view of another embodiment of a drive shaft incorporating two double knuckle type couplings. In this embodiment, the output end of the drive shaft utilizes an output shaft and an output shaft adapter suitable for connecting to a driven component.

FIG. 16 is a side cut-away view of another embodiment of a drive shaft incorporating two double knuckle type couplings. In this embodiment, the output end of the drive shaft utilizes an output shaft and an output shaft adapter connected to a subsequent driven shaft.

FIG. 17 shows the pivot points X and Y for the center coupling element.

DETAILED DESCRIPTION

The present invention provides an improved drive shaft configuration 10 designed for transmission of torsional and axial forces. The configuration and operational aspects of drive shaft configuration 10 will be described in terms of a mud motor transmission. However, drive shaft configuration 10 is suitable for use in devices requiring transmission of torque through a coupling requiring accommodation of angular changes between drive shafts. Non-limiting examples of such operations may include drive shafts wherein drive shaft configuration 10 replaces universal joints or continuous velocity joints.

Figure 1:
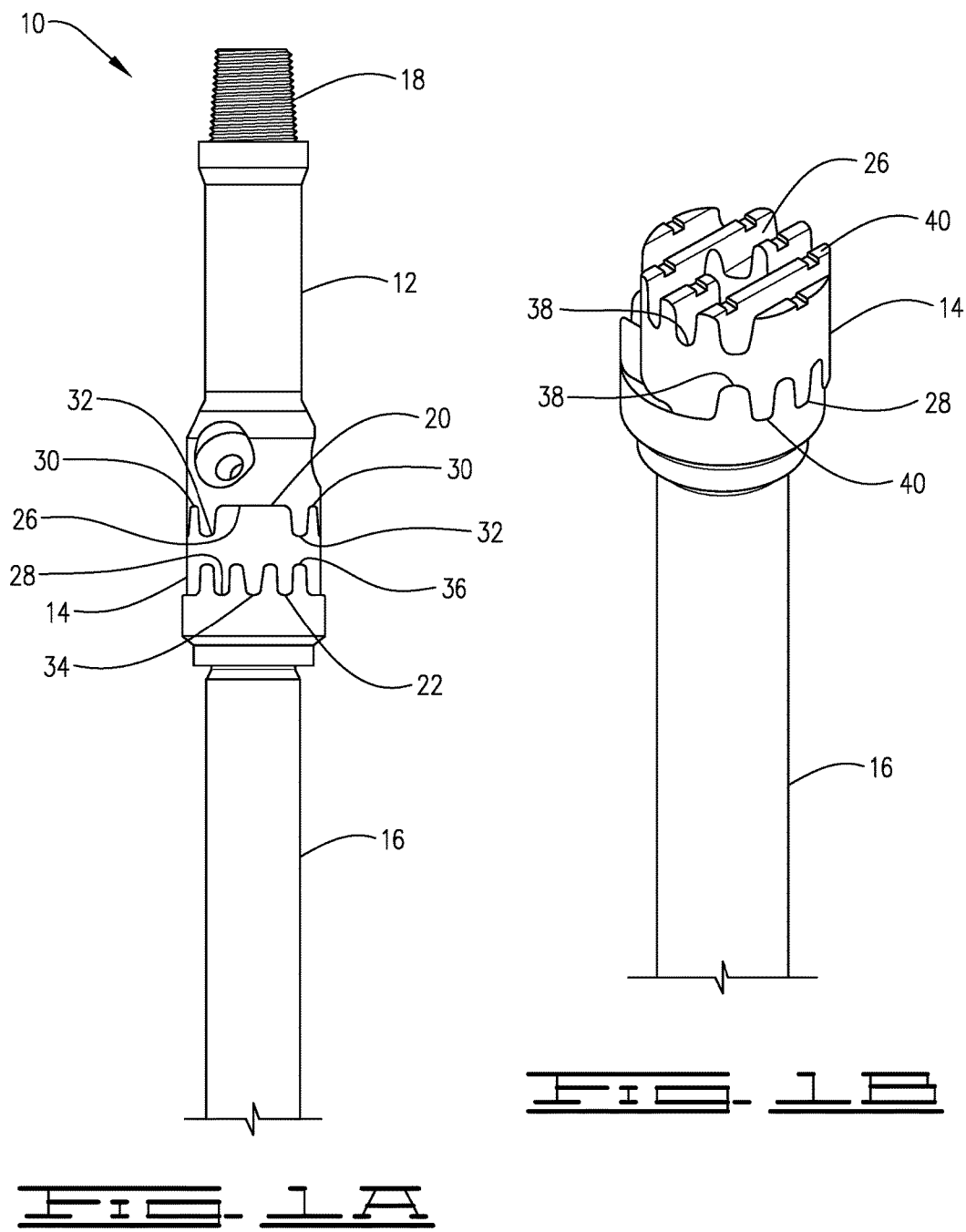
FIG. 1A is a side view of the first coupling in the first embodiment of the invention.
FIG. 1B is a close up view of the first coupling depicted in FIG. 1A.
Figure 2:
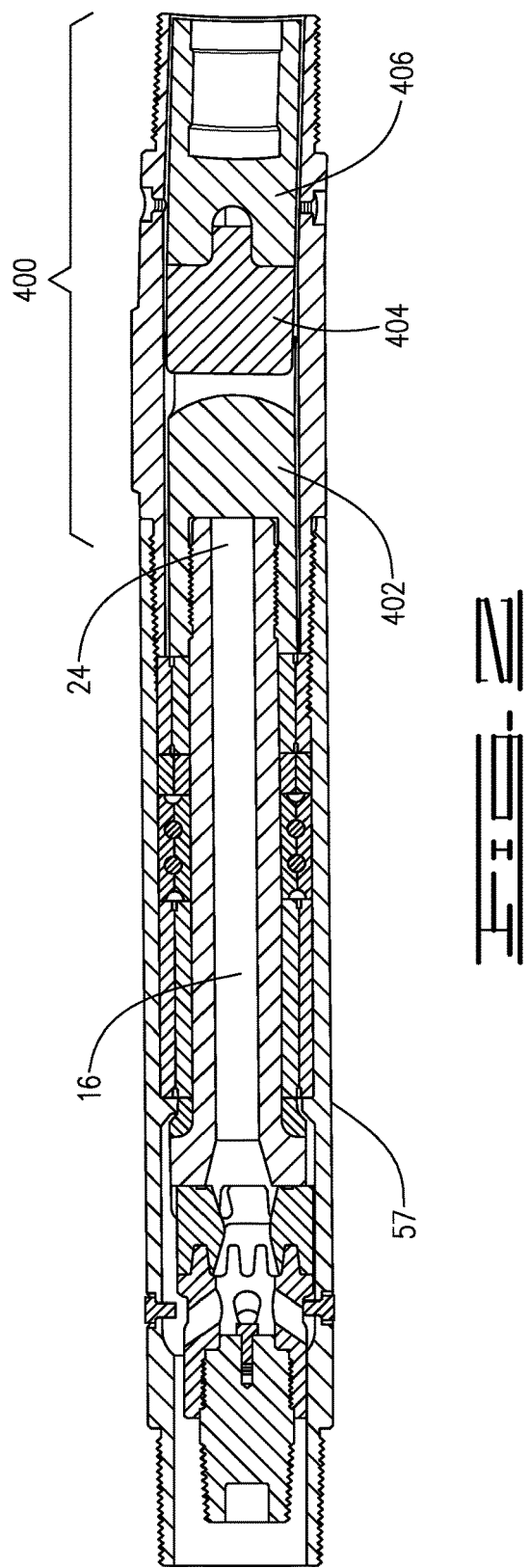
FIG. 2 is a cut-away view of a mud motor transmission using the first embodiment of the invention wherein the input coupling is a slip type coupling and the output coupling is a double knuckle coupling.
Figure 3:
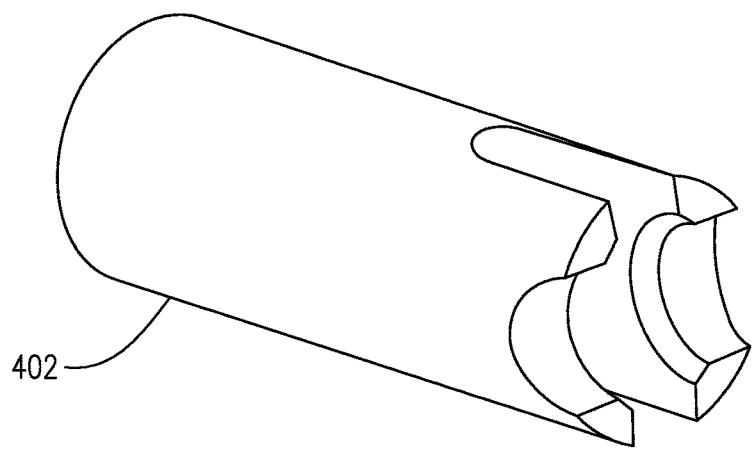
FIG. 3 is a view of the coupling input yoke of the output coupling.
Figure 4:
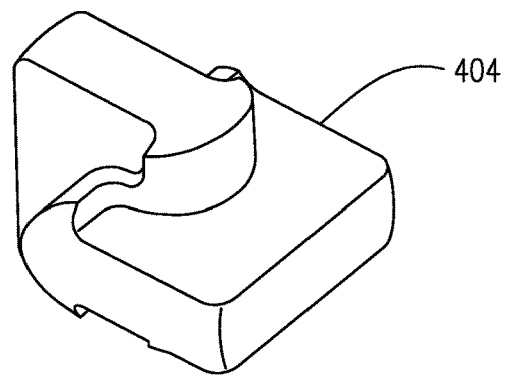
FIG. 4 is a view of the coupling center element of the output coupling.
Figure 5:
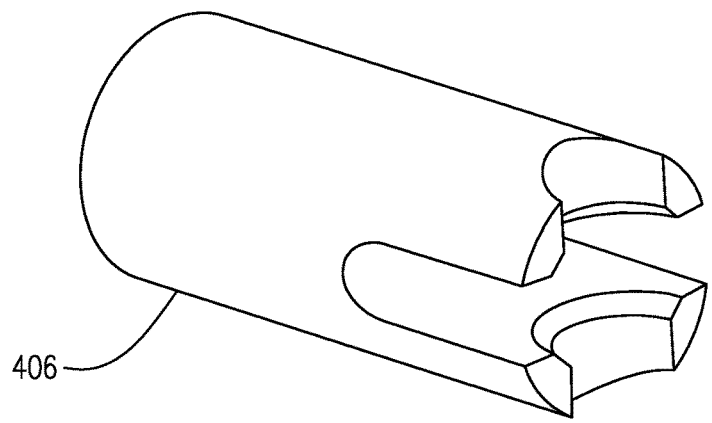
FIG. 5 is a view of the coupling output yoke.
Figure 5:
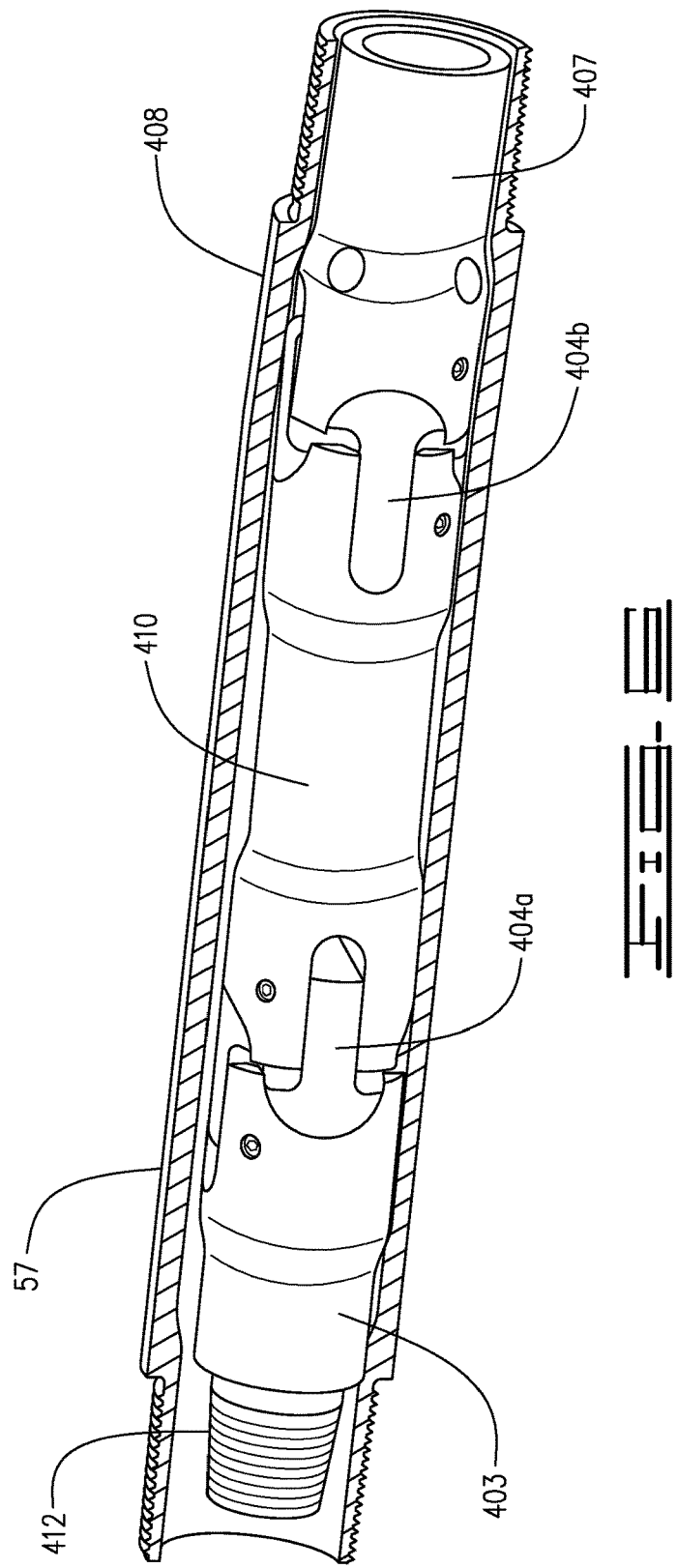
Figure 10:
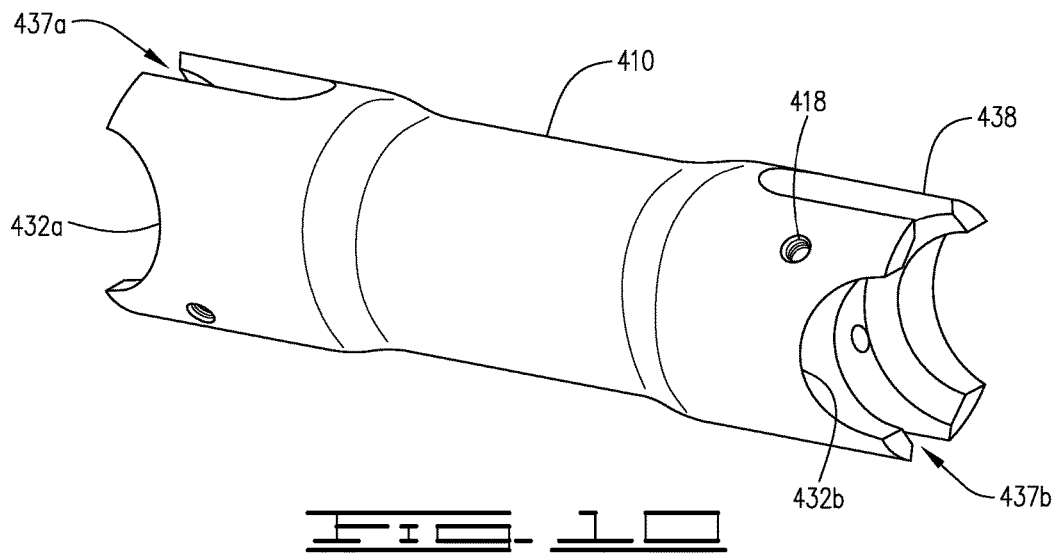
FIG. 10 is a perspective view of the center shaft.

With initial reference to FIGS. 1 and 2, in one embodiment drive shaft configuration 10 includes a first input shaft 12, a wear disk 14 and a second input shaft 16. First input shaft 12 has a first end 18 and a second end 20. Second input shaft 16 has a first end 22 and a second end 24. Wear disk 14 has a first wear surface 26 and a second wear surface 28. First end 18 of first input shaft 12 and second end 24 of second input shaft 16 may be threaded or configured in any convenient manner for securing to other components in a drive train or a drill string.

Second end 20 of first input shaft 12 has at least one slot 30 and at least one outwardly projecting ridge 32. Similarly, first end 22 of second input shaft 16 has at least one slot 34 and at least one outwardly projecting ridge 36. Each wear surface 26 and 28 of wear disk 14 has a corresponding slot 38 and a corresponding ridge 40 configured to receive or mate with slots 30, 34 and ridges 32, 36 of input shafts 12, 16.

With reference to FIGS. 1A and 1B, the geometric configuration of slots 30, 34, 38 and ridges 32, 36, 40 may vary with the use of drive shaft configuration 10. Suitable configurations include, but are not limited to, rectangular, trapezoidal (i.e. tapered), triangular and scalloped. Ridges and slots will generally have corners rounded to reduce friction and stress. Generally, ridges 32, 36, 40 will have a trapezoidal or tapered. Typically, a tapered or trapezoidal surface will allow for coupling wear without loss of face contact. Thus, this configuration extends coupling life by maintaining the relative alignment and configuration of coupling components. The height, width, taper angle and number of teeth can be varied for the coupling size and application. The change in width for ridges 32, 36, 40 from the base of ridge 40 to the terminal surface may be between 0% and 50%. Typically, for trapezoidal ridges 40, the terminal surface will be between 10% and 50% narrower than the base. As depicted therein, drive shaft configuration 10 utilizes reversed taper or a "dovetail" configuration for slots 30, 34, 38 and ridges 32, 36, 40.

Further, as depicted in FIG. 1b, outwardly projecting ridges 40 carried by wear disk 14 optionally include lubrication grooves in the terminal surface. Although shown only on ridges 40 of wear disk 14, all contact surfaces of drive shaft configuration 10 may include lubrication grooves to enhance movement of drilling mud and other lubricants across and through drive shaft configuration 10.

Wear disk 14 transfers torsional and axial forces received at first input shaft 12 to second input shaft 16 while accommodating eccentric or parallel offset shaft alignments thereby substantially eliminating or at least substantially minimizing angular changes in movement produced at either input shaft 12, 16. The configuration and cooperation of slots 30, 34, 38 and ridges 32, 36, 40 permit lateral slippage between input shafts 12, 16 and wear disk 14. Such movement between components will naturally produce surface wear. Typically, the configuration of wear disk 14 in cooperation with input shafts 12, 16 provides continuous structural alignment of coupling components, despite erosion of surfaces on wear disk 14 and input shafts 12, 16. Further alignment relationship is provided by a coupling housing 57 as depicted in FIG. 2.

To provide for a generally even rate of erosion across surfaces 26 and 28, wear disk 14 will generally be manufactured from a high-strength alloy steel, such as 300M, 4340, 8620 or a stainless steel composition identical to that used for the shafts 12 and 16 with all contact surfaces carrying optional hard coatings such as a ceramic based or cobalt-tungsten carbide coating to provide additional wear and abrasion resistance. Alternatively, wear disk 14 may be made from a sacrificial material such as a high strength bronze. In one embodiment, all sliding or contact surfaces 26, 28, and ends 20, 22 will carry a wear and abrasion resistant surface treatment. As will be explained in more detail below, in the context of a mud motor transmission, the unique, unsecured, arrangement of wear disk 14 between input shafts 12, 16 provides for the efficient translation of rotational energy between non-aligned input shafts, i.e. input shafts having offset, parallel axes of rotations. In general, the configuration of input shafts 12, 16 and wear disk 14 reduces g-force values experienced by drive shaft configuration 10 by about 80% to about 93% when compared to a conventional "jaw clutch" coupling currently used by the industry thereby reducing shock to internal components, providing quieter operations and lengthening the operational life of drive shaft configuration 10.

As depicted in FIG. 2, drive shaft configuration 10 carries a double knuckle coupling 400 secured to end 24 of second input shaft 16. Double knuckle coupling 400 includes a coupling input yoke 402, a coupling center element 404 and a coupling output yoke 406. Finally, as depicted in FIG. 6, a bent housing 408, also known as a bend housing, may house double knuckle coupling 400 if drive shaft 10 is utilized in a mud motor transmission. Double knuckle coupling 400 may be secured to any conventional bit box or secured to other driven downhole tools known to those skilled in the art. Alternatively, double knuckle coupling 400 may be secured to any driven component in a manner suitable to transmit torque to the driven component.

Thus, drive shaft configuration 10 when incorporated into mud motor transmission 100 provides the capability to drive a drill bit during directional drilling operations while providing a readily replaceable coupling. However, the present invention provides significant additional advantages.

Double knuckle coupling 400 is secured to end 24 of shaft 16 by any conventional means suitable for the intended use of drive shaft 10. Coupling input yoke 402 has a first end and a second end. The first end is secured to end 24. Second end has a slot 436 defining a tongue and groove configuration. Each tongue 434 has an arcuate recess 432. Coupling center element 404 has a first tongue 415 configured to be received within slot 436 and a second tongue 417 configured to be received within slot 439 of coupling output yoke 406. Additionally, center coupling element carries two pairs of arcuate knuckles 411 configured to be received within the respective arcuate recesses of coupling input yoke 402 and coupling output yoke 406. Each faces 416 of each tongue 415, 417 act as torque reaction faces 416 suitable for transferring torque from input yoke to output yoke. Additionally, knuckles 411 have a radius transition from the arcuate surface to the torque reaction face that further enhances torque transfer by accommodating axial forces applied to the coupling input yoke. The relative lengths of each tongue of the components in the second coupling may vary depending upon the components driven by the shafts connected by the describe couplings. Finally, all of the components may be positioned within a housing.

With reference to FIG. 6, a drive shaft 10 having two double knuckle couplings 400 may be placed within bent sub-housing 408 or substituted for any drive shaft having two CV joints or universal joints. The drive shaft includes an input shaft 403, a center shaft 410, an output shaft 407 and two coupling center elements 404. The input shaft 403, first center coupling 404a and first end of the center shaft 410 define a first double knuckle coupling. The output shaft 407, second center coupling 404b and second end of the center shaft 410 define a second double knuckle coupling. As reflected in FIGS. 7-8, input shaft 403 functionally corresponds to input yoke 402 and output shaft 407 functionally corresponds to output yoke 406.

The first and second ends of center shaft 410 carry coupling yokes each coupling yoke defines a tongue and groove arrangement with each tongue 438 having an arcuate recess 432. Slots 437 defined by the first and second coupling yokes may be in-line with one another or out of alignment with one another.

The first end of the input shaft 403 is configured for attachment to a power input component and the second end of the input shaft 403 defines a tongue and groove arrangement with each tongue 434 having an arcuate recess 432. The input shaft may be an integral component or the input shaft may carry an input shaft adapter 412 suitable for securing the input shaft to a driving component. As depicted in FIG. 8, input shaft adapter 412 has an internal hex 413. FIGS. 18-21 depict a more typical embodiment of input shaft adapter 412. As depicted therein, input shaft adapter 412 has an external wrenching hex 421. Prior to installation of input shaft adapter 412 on input shaft, a lockwire 442 is placed over the threads 444 of input shaft adapter 412. Finally, after installation of input shaft adapter 412 into input shaft 403 and tightening to the proper torque, a lockwire 442 is inserted through a hole 447 in input shaft 403 and conforms around grooves 449 in input shaft adapter 412 and input shaft 403 (groove not shown on input shaft). A machineable washer 440 is placed over wrenching hex 421. Machineable washer 440 protects wrenching hex 421 from damage and provides a smooth transition from input shaft 403 to input shaft adapter 412.

The first end of the output shaft 407 defines a tongue and groove arrangement with each tongue 441 having an arcuate recess 443 and the second end of the output shaft configured to be attached to a driven component. In one embodiment, the output shaft is an integral component including fluid flow ports 422 suitable for use as a flow diverter in the downhole environment. In another embodiment, the output shaft carries an output shaft adapter suitable for securing to a driven component such as a flow diverter or other driven component.

In one embodiment, each tongue on input shaft 403, center shaft 410 and output shaft 407 has at least one retaining pin bore or hole 424, 418 and 420 respectively. Each coupling center element 404 has first and second tongues 415, 417 with each tongue defining a torque reaction face 416. Additionally, each coupling center has two pair of knuckles 411 configured to be received within the arcuate recesses of each tongue. As depicted, coupling center element 404 is symmetrical and may be installed with either tongue "up or down." In each pair of knuckles, a knuckle 411 is located on each side of the coupling center's tongues 415, 417. Thus, the knuckles 411 are separated or spaced apart an appropriate distance for alignment with the arcuate recesses of the respective receiving tongues.

For the first coupling center element 404a, the first tongue 415 is positioned within the slot 436 defined by the tongue and groove configuration carried by the input shaft 403 and the first knuckles 411 are received within the arcuate recesses 432 of the input shaft's tongues 434. The second tongue 417 of the first coupling center element 404a is positioned within the slot 437a defined by the tongue and groove configuration carried by the first end of the center shaft 410 and the second knuckles 411 of the first coupling center element 404a are positioned within the arcuate recesses 432a of the tongues 438 of the first end of the center shaft 410. Likewise, the first tongue of the second coupling center element 404b is positioned within the slot 437b defined by the tongue and groove configuration of the second end of the center shaft 410 with the first pair of knuckles 411 carried by the second coupling center element 404b positioned within the arcuate recesses 432b of the tongues 438 of the second end of the center shaft 410. Following assembly of the drive shaft components positioned within each retaining pin bore 418 of center shaft 410, 424 of input shaft 403, 420 of output shaft 407 is a retaining pin 426.

Retaining pins 426 have a loose, clearance fitting within holes 418, 420 or 424. Further pins 426 have a loose, clearance fitting within the closed bottom holes 414 of center coupling element 404. However to ensure freedom of movement about pin 426 during pivotal movement of each double knuckle coupling 400, holes 414 are larger in diameter than holes 418, 420 and 424. Thus, the freedom of movement provided by the retaining pins 426 within holes 414, 418, 420 and 424 enables pivotal movement about points X and Y as depicted in FIG. 17. Finally, pipe plugs 428 or equivalent elements placed over pins 426 secure retaining pins 426 in the holes of double knuckle coupling 400.

Figure 11:
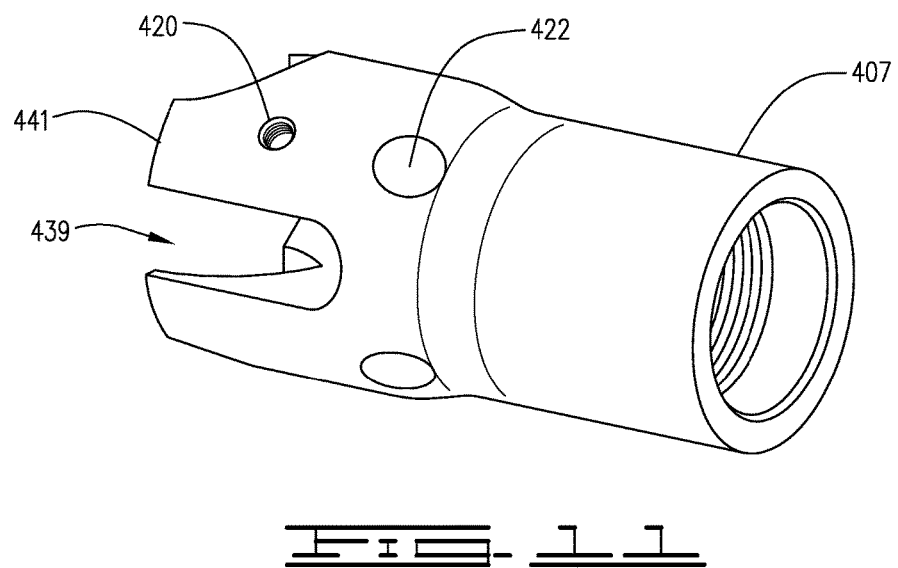
FIG. 11 is a perspective view of one embodiment of an output shaft.
Figure 12:
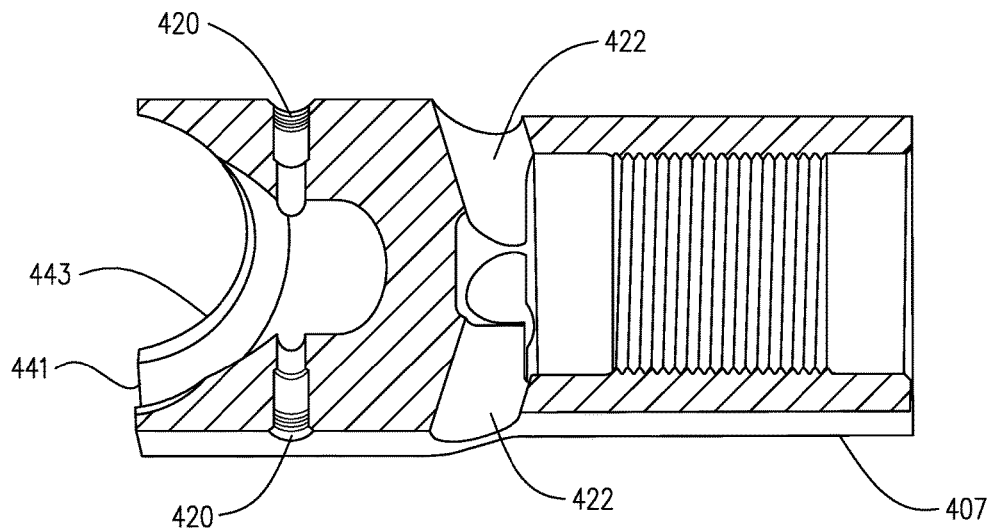
FIG. 12 is a side cut-away view of one embodiment of an output shaft showing retaining pin holes and fluid flow holes suitable appropriate for when the coupling is incorporated into a mud motor transmission.
Figure 13:
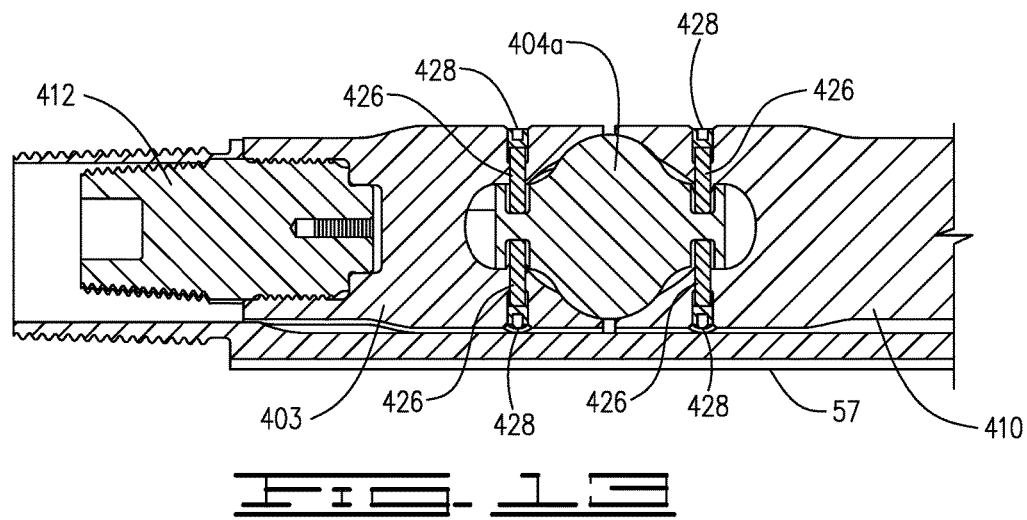
FIG. 13 is a side cut-away view depicting pins passing through holes in the input shaft and center shaft securing the input shaft and center shaft to a center coupling element.
Figure 18:
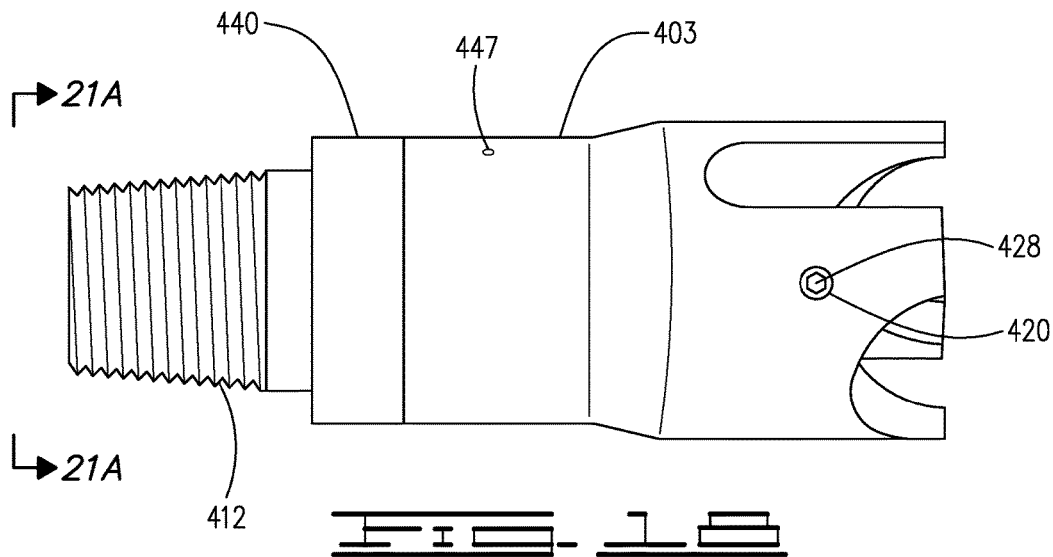
FIG. 18 is a side view of the input shaft with an input shaft adapter and machineable washer in place.
Figure 19:
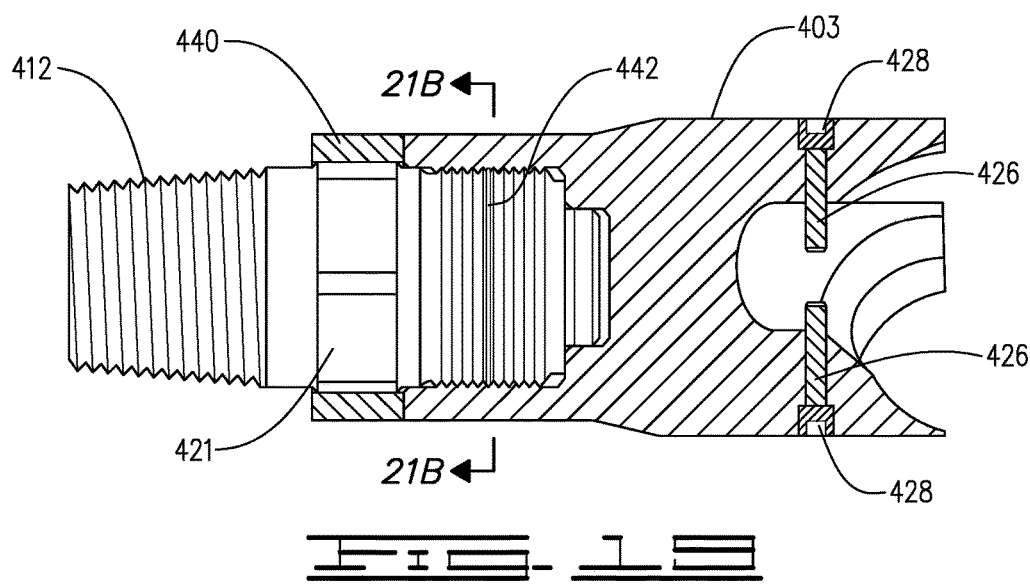
FIG. 19 is a side cut-away view of the input shaft with installed shaft adapter and machineable washer and depicting the positioning of a lockwire.
Figure 20:
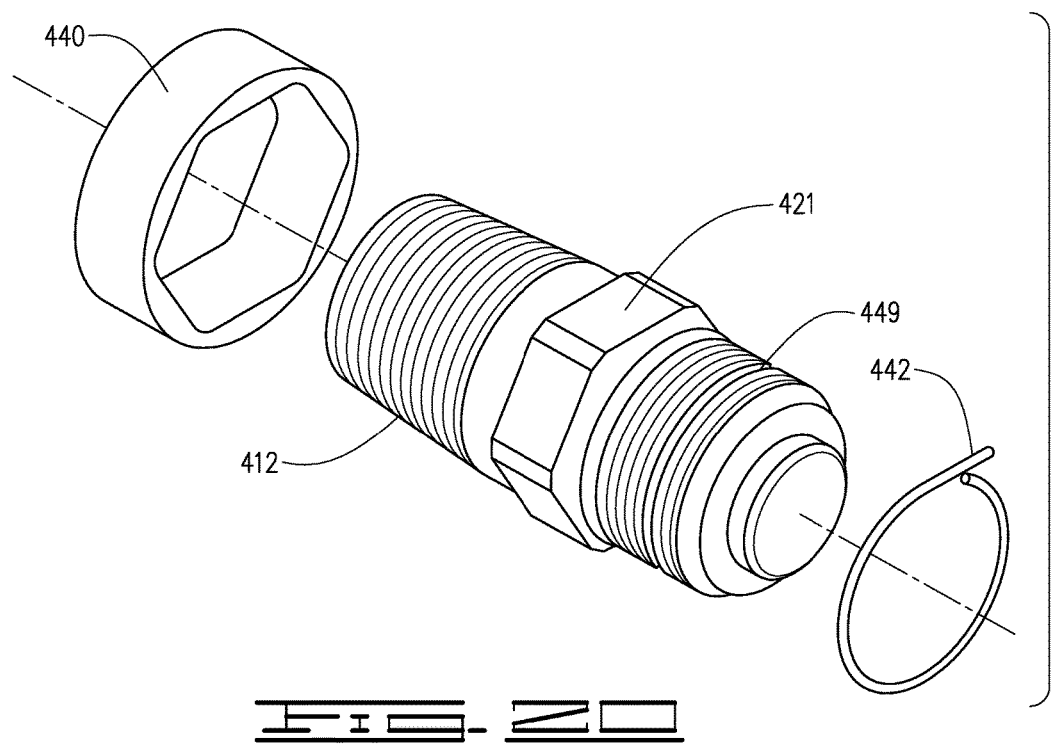
FIG. 20 is a perspective view of the machineable washer, input shaft adapter and lockwire prior to assembly.
Figures 21A, 21B:
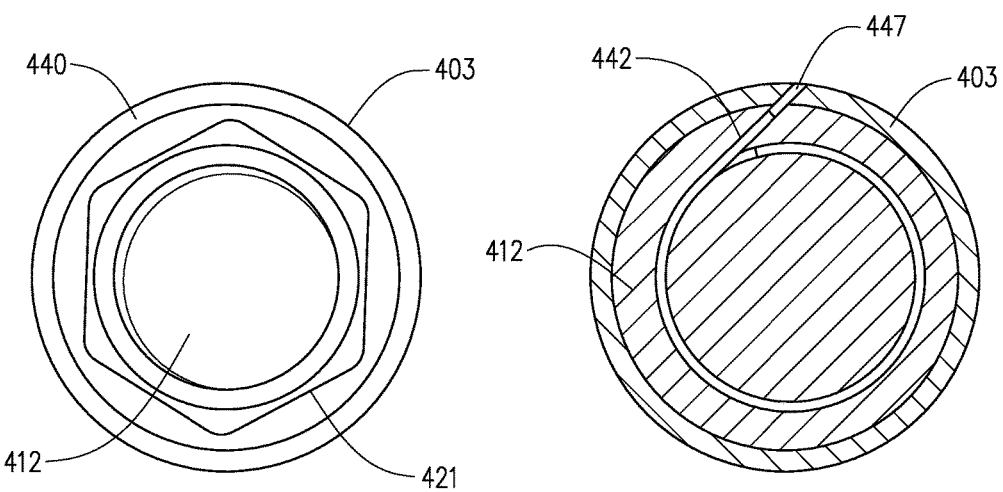
FIG. 21A is an end-view of input shaft adapter installed on the input shaft with the machineable washer in place over the wrenching hex of the input shaft adapter.
FIG. 21B is an end-cut-away view of input shaft adapter installed on the input shaft with the machineable washer in place over the wrenching hex of the input shaft adapter taken along line 21B of FIG. 19.

In the previous embodiment, output shaft 407 was adapted for use in a mud motor transmission. As depicted in FIGS. 11-12, the second end of output shaft was threaded for securing to a bit box or other downhole tool. Additionally, output shaft 407 included mud flow passage ports 422. However, output shaft 407 may be adapted for any power output configuration for above surface or downhole use. As depicted in FIGS. 15-16, output shaft 407 carries an output shaft adapter 409 suitable for connecting to a cross-flow diverter, as depicted, or to any other driven component including but not limited to a differential, a transmission gear box or any similar device requiring input of power.

In the embodiment of FIGS. 15 and 16, the drive shaft incorporates two double knuckle couplings as discussed above. The second double knuckle coupling includes output shaft 407, which will have a first end with the same tongue and groove configuration as the first end of output shaft 407. The only difference being the configuration of the second end of output shaft 407. In this embodiment, output shaft 407 carries output shaft adapter 409. Output shaft adapter 409 has a first end secured by any conventional means to the second end of output shaft 407, as depicted, the connection is provided by threads. The second end of output shaft 432 may carry threads or any other configuration suitable for connecting to a driven component or an additional shaft.

Figure 22:
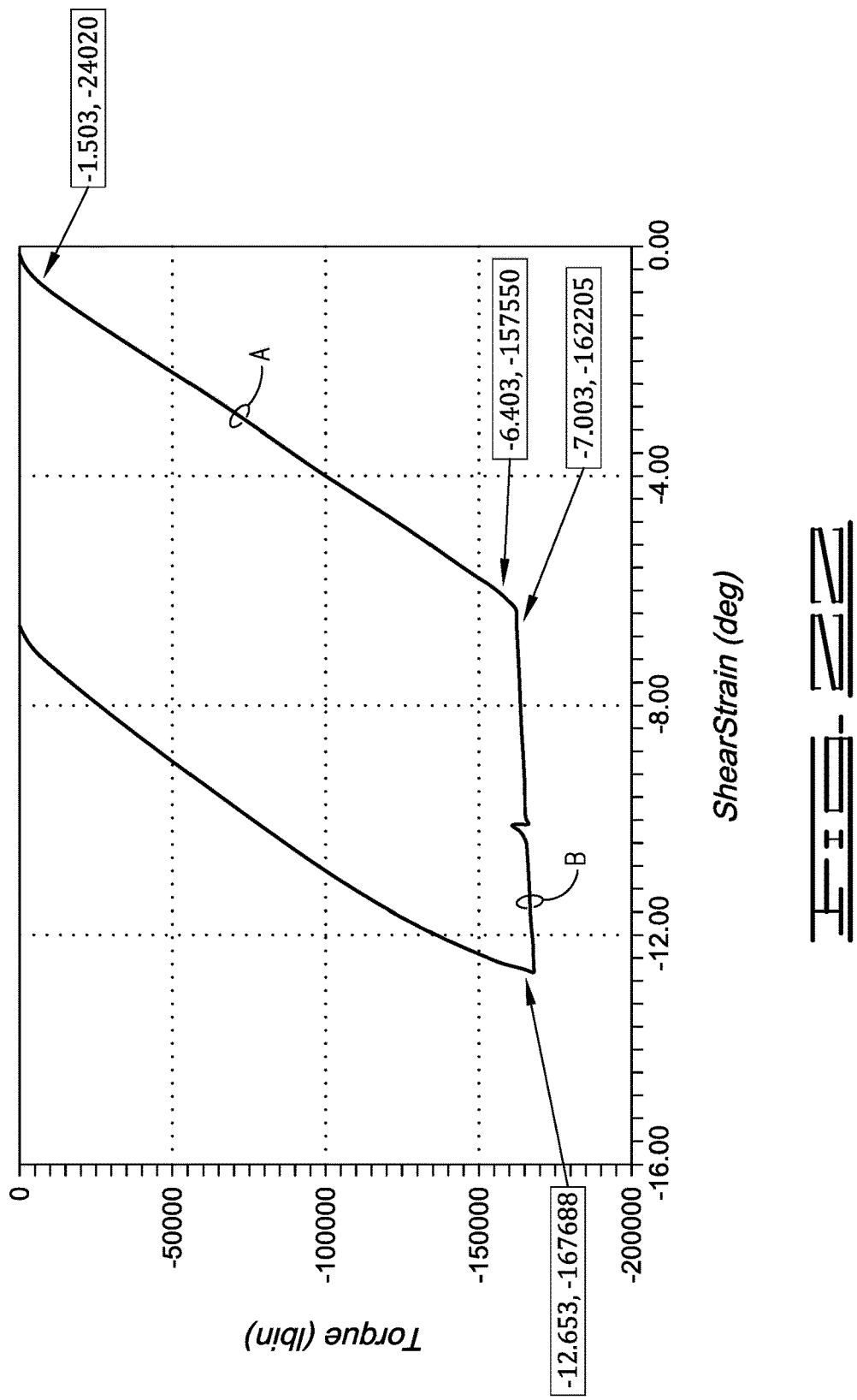
FIG. 22 provides the data produced by testing the device of FIGS. 6-21 on a torsion test machine.
Figure 23:
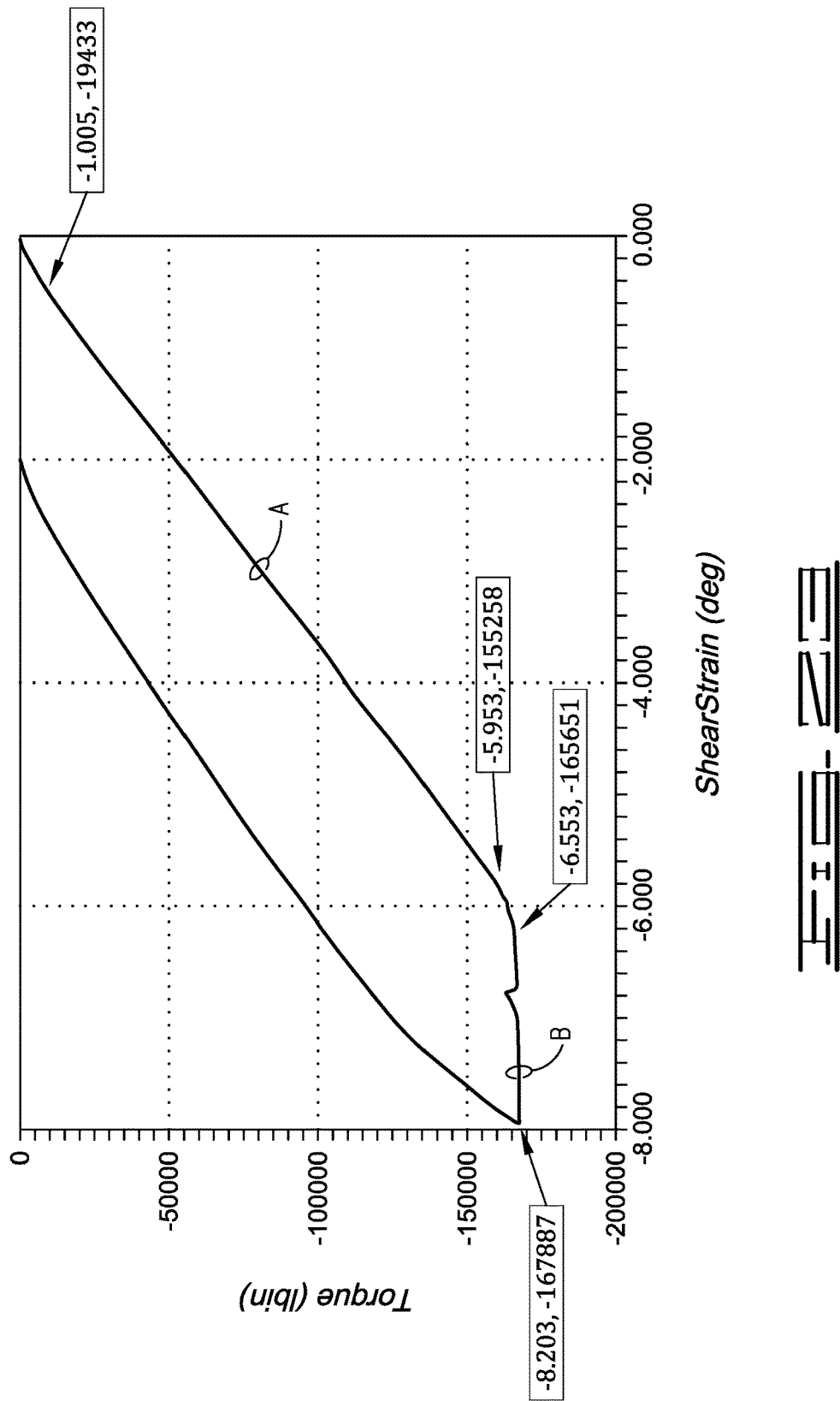
FIG. 23 provides the data produced by testing the device of FIGS. 6-21 on a torsion test machine.

To demonstrate the improvement provided by the configuration depicted in FIGS. 6-21, the embodiment of FIGS. 6-21 was tested on a Dyna Drill dynamometer. The shaft was run for a period of 14 hours at 4,000 pound*feet of torque (about 5423 Nm of torque; also the maximum rating for the mud motor used) using water only to represent the drilling fluid. Following this test, the same driveshaft was fitted to a torsional test machine at LORD Corporation. A 300,000 pound*inch torque cell (about a 33.9 KNm torque cell) was used to measure the torque during the testing. In the test environment, housing 408 was omitted as being unnecessary. For the purpose of this test a 300,000 pound*inch torque (about 33.9 KNm torque) was fitted to the torsional test machine. Three test runs were conducted. Test Run 1 was discarded due to slippage. Test Runs 2 and 3 are depicted in FIGS. 22-23. During a subsequent test, the torsional test machine's threaded rod, representing the equivalent of a drill bit mandrel, fractured. The threaded rod was constructed of 300M alloy steel. Steel of this quality is considered to be stronger than a conventional down-hole drill bit mandrel. Since the testing procedure did not damage the double-knuckle joints or center shaft of the drive shaft, one can conclude that the configuration of the device depicted in FIGS. 6-21 has torque transmission capabilities greater than that of a conventional down-hole drill bit mandrel.

With reference to FIGS. 22-23, configuration of two double knuckle with a center shaft joining an input shaft to an output shaft successfully operated to a stall torque of 14,000 lb*ft (168,000 lb*in or about 19 KNm). In FIG. 22, the slope of line A=−24020+157550/−1.503+6.403=27251 lb*in/degree (about 3.1 KNm/degree) and the slope of line B=−167688+162205/−12.653+7.003=970 lb*in/degree (about 110 Nm/deg). Line B does reflect slight slippage of the threads. In FIG. 23, the slope of line A=−155258+19433/−5.953+1.005=27450 lb*in/degree (about 3.1 KNm/degree) and the slope of line B=−167887+165651/−8.203+6.553=1355 lb*in/degree (about 153 Nm/degree). Line B does reflect slight slippage of the threads.

The data of FIGS. 22-23 indicate that the shaft performed as expected during the test and that the threaded joint between the test machine and threaded stud continued to slip or yield toward the upper limits of the testing.

In operation, a drive shaft 10 incorporating two double knuckle joints 400 will provide improved transmission of torque from input shaft 403 to output shaft 407. The configuration depicted in FIGS. 6-21 provides two torque paths. The first torque path follows the tongue and groove components of input shaft 403, center shaft 410, output shaft 407 and center coupling elements 404a and 404b. Thus, torque applied to input shaft 403 passes from tongue 434 to torque transfer faces 416 of tongue 415 of center coupling element 404a. Center coupling element torque transfer faces 416 of tongue 417 in turn transfers torque to tongues 438 forming first slot 437a. Likewise, tongues 438 at slot 437b transfer torque to torque transfer faces 416 of tongue 415 of center coupling element 404b. Finally, torque transfer faces 416 of tongue 417 of center coupling element 404b transfers torque to tongues 441 of output shaft 407.

The second torque path provides improved efficiencies. The second torque path utilizes the arcuate contact points of the double knuckle joint 400. Specifically, as described above, each tongue 434 of the input shaft 407 has an arcuate recess 432. Likewise, each tongue of center shaft 410 has a tongue 438 with an arcuate recess 432 and each tongue 441 of output shaft 407 has an arcuate recess 443. The arcuate recesses in the tongues of the input shaft, 403, center shaft 410 and output shaft 407 have radii corresponding to the arcuate surface of each knuckle 411 of center coupling elements 404. The second torque path follows the arcuate recesses of the tongues and arcuate surfaces of the knuckles until reaching output shaft 407.

Other embodiments of the present invention will be apparent to one skilled in the art. As such, the foregoing description merely enables and describes the general uses and methods of the present invention. Accordingly, the following claims define the true scope of the present invention.

What is claimed is:

1. A double knuckle coupling comprising:
   an input shaft, said input shaft having a first end and a second end, said second end has a tongue and groove configuration, said tongue and groove configuration defining a slot, and each tongue, of said tongue and groove configuration has an arcuate recess;
   an output shaft, said output shaft having a first end and a second end, said first end has a tongue and groove configuration, said tongue and groove configuration defining a slot, and each tongue of said tongue and groove configuration has an arcuate recess; and
   a center coupling element, said center coupling element has a first tongue configured to be received within said slot of said second end of said input shaft and a second tongue configured to be received within the slot of said first end of said output shaft; and
   said center coupling element further comprises two pairs of knuckles, each of said knuckles having an arcuate surface configured to be received within said arcuate recesses of said tongues of said input shaft and said output shaft.

2. The double knuckle coupling of claim 1, wherein each tongue of said center coupling element further comprises a torque reaction face and a radius transition, said radius transition connects said torque reaction face to the arcuate surface.

3. The double knuckle coupling of claim 2, wherein at least one of said torque reaction faces has a retaining pin hole.

4. A drive shaft comprising:
   an input shaft having a first and second end, said input shaft second end has a tongue and groove configuration, said tongue and groove configuration defining a slot, and each tongue, of said tongue and groove configuration has an arcuate recess;
   a center shaft having a first end and a second end, said first end has a tongue and groove configuration, said first end tongue and groove configuration defining a slot, and each tongue of said first end tongue and groove configuration has an arcuate recess and said second end has a tongue and groove configuration, said second end tongue and groove configuration defining a slot, and each tongue of said second end tongue and groove configuration has an arcuate recess;
   an output shaft having a first and second end, said output shaft first end has a tongue and groove configuration, said tongue and groove configuration defining a slot, and each tongue, of said tongue and groove configuration has an arcuate recess;
   a first unitary center coupling element positioned between said input shaft and said center shaft, said first unitary center coupling element comprises two pairs of knuckles, each of said knuckles having an arcuate surface configured to be received within said arcuate recesses of said tongues of said second end of said input shaft and within said arcuate recesses of said tongues of said first end of said center shaft;
   a second unitary center coupling element positioned between said center shaft and said output shaft, said second unitary center coupling element comprises two pairs of knuckles, each of said knuckles having an arcuate surface configured to be received within said arcuate recesses of said tongues of said second end of said center shaft and within said arcuate recesses of said tongues of said first end of said output shaft;
   wherein said input shaft, first unitary center coupling and first end of the center shaft define a first double knuckle coupling and the output shaft, second unitary center coupling and second end of the center shaft define a second double knuckle coupling.

5. The drive shaft of claim 4, wherein each tongue of said first and second unitary center coupling elements further comprises a torque reaction face and a radius transition, said radius transition connects said torque reaction face to the arcuate surface.

6. The drive shaft of claim 5, wherein at least one of said torque reaction faces has a retaining pin hole.

7. A flexible joint configured to transmit torque along two distinct paths, said joint comprising:
   an input shaft having a first and second end, said input shaft second end has a tongue and groove configuration, said tongue and groove configuration defining a slot, and each tongue of said tongue and groove configuration has an arcuate recess;
   a center shaft having a first end and a second end, said center shaft second end has a tongue and groove configuration, said tongue and groove configuration defining a slot, and wherein each tongue of said tongue and groove configuration has an arcuate recess;
   an output shaft having a first and second end said output shaft first end has a tongue and groove configuration, said tongue and groove configuration defining a slot, and each tongue of said tongue and groove configuration has an arcuate recess;
   a first unitary center coupling element positioned between said input shaft and said center shaft, said first unitary center coupling element has a first tongue configured to be received within said slot of said second end of said input shaft and a second tongue configured to be received within the slot of said first end of said center shaft, said first unitary center coupling element has two pairs of knuckles, said knuckles having an arcuate surface configured to be received within said arcuate recesses of said tongues of said input shaft and said center shaft;
   a second unitary center coupling element positioned between said center shaft and said output shaft, said second unitary center coupling element has a first tongue configured to be received within said slot of said second end of said center shaft and a second tongue configured to be received within the slot of said first end of said output shaft, said second unitary center coupling element further comprises two pairs of knuckles, said knuckles having an arcuate surface configured to be received within said arcuate recesses of said tongues of said center shaft and said output shaft;
   wherein said tongue and groove configurations of said input shaft, said center shaft and said output shaft cooperation with said tongues of said first and second unitary center coupling elements to define a first torque path; and,
   wherein said arcuate recesses of said input shaft, said center shaft and said output shaft cooperate with said knuckles of said unitary center coupling elements to define a second torque path.

8. The flexible joint of claim 7, wherein each tongue of each of said unitary center coupling elements further comprises a torque reaction face and a radius transition, said radius transition connects each said torque reaction face to the arcuate surface.

9. A double knuckle coupling configured to transmit torque along two distinct paths, said double knuckle coupling comprising:
- an input shaft, said input shaft having a first end and a second end, said second end has a slot defining a tongue and groove configuration wherein each tongue has an arcuate recess;
- an output shaft, said output shaft having a first end and a second end, said first end has a slot defining a tongue and groove configuration wherein each tongue has an arcuate recess;
- a unitary center coupling element, said unitary center coupling element has a first tongue configured to be received within said slot of said second end of said input shaft and a second tongue configured to be received within the slot of said first end of said output shaft, said unitary center coupling element has two pairs of knuckles, each of said knuckles has an arcuate surface configured to be received within said arcuate recesses of said tongues of said input shaft and said output shaft;
- wherein said tongue and groove configurations of said input shaft and said output shaft cooperation with said tongues of said unitary center coupling element to define a first torque path; and,
- wherein said arcuate recesses of said input shaft and said output shaft cooperate with said knuckles of said unitary center coupling element to define a second torque path.

\* \* \* \* \*